United States Patent [19]
Volpe

[11] Patent Number: 5,618,628
[45] Date of Patent: Apr. 8, 1997

[54] SOL GEL BARRIER FILMS

[75] Inventor: Raymond A. Volpe, Highland Mills, N.Y.

[73] Assignee: International Paper Company, Purchase, N.Y.

[21] Appl. No.: 594,080

[22] Filed: Jan. 30, 1996

Related U.S. Application Data

[62] Division of Ser. No. 398,636, Mar. 3, 1995, Pat. No. 5,510,147.

[51] Int. Cl.$^6$ .................................................. B01J 13/00
[52] U.S. Cl. ...................... 428/450; 428/452; 252/313.2; 252/315.6; 106/287.16
[58] Field of Search .................................. 428/450, 452; 252/313.2, 315.6; 106/287.16

[56] References Cited

U.S. PATENT DOCUMENTS

| | | | |
|---|---|---|---|
| H626 | 4/1989 | Covino | 501/12 |
| 3,640,093 | 2/1972 | Levene et al. | 65/134 |
| 3,854,961 | 12/1974 | Flasch | 106/38.3 |
| 4,361,598 | 11/1982 | Yoldas | 427/74 |
| 4,385,086 | 5/1983 | Nakayama et al. | 427/387 |
| 4,386,134 | 5/1983 | Puhringer | 428/447 |
| 4,423,112 | 12/1983 | Luthringshauser | 428/389 |
| 4,476,156 | 10/1984 | Brinker et al. | 427/82 |
| 4,477,499 | 10/1984 | Doin et al. | 427/412.1 |
| 4,581,252 | 4/1986 | Guerra et al. | 427/162 |
| 4,614,673 | 9/1986 | Bendig | 427/376.2 |
| 4,636,440 | 1/1987 | Jada | 428/446 |
| 4,741,778 | 5/1988 | Horie et al. | 106/287.16 |
| 4,789,563 | 12/1988 | Stevens | 427/252 |
| 4,798,629 | 1/1989 | Wood et al. | 106/287.16 |
| 4,801,399 | 1/1989 | Clark et al. | 252/315.01 |
| 4,842,837 | 6/1989 | Shimizu et al. | 423/335 |
| 4,842,901 | 6/1989 | Merrem et al. | 427/387 |
| 4,849,378 | 7/1989 | Hench et al. | 501/12 |
| 4,966,812 | 10/1990 | Ashley et al. | 428/412 |
| 4,990,377 | 5/1991 | Wilson | 427/387 |
| 4,997,482 | 3/1991 | Haluska et al. | 106/287.16 |
| 5,013,588 | 5/1991 | Lin | 427/397.7 |
| 5,035,745 | 7/1991 | Lin et al. | 106/287.16 |
| 5,049,414 | 9/1991 | Kato | 427/164 |
| 5,053,081 | 10/1991 | Jacob | 106/287.11 |
| 5,084,356 | 1/1992 | Deak et al. | 428/458 |
| 5,091,009 | 2/1992 | Nagomi et al. | 106/287.1 |
| 5,091,224 | 2/1992 | Kushida et al. | 427/419.4 |
| 5,096,738 | 3/1992 | Wyman | 427/44 |
| 5,160,455 | 11/1992 | Clark et al. | 252/315.7 |
| 5,175,027 | 12/1992 | Holmes-Farley et al. | 427/387 |
| 5,186,745 | 2/1993 | Maniar | 106/287.16 |
| 5,196,382 | 3/1993 | Hench et al. | 501/12 |
| 5,264,197 | 11/1993 | Wang et al. | 423/338 |
| 5,266,358 | 11/1993 | Uemura et al. | 427/376.2 |
| 5,275,796 | 1/1994 | Tillotson et al. | 423/338 |
| 5,281,657 | 1/1994 | Mautner et al. | 524/745 |
| 5,316,699 | 5/1994 | Ritter et al. | 252/584 |
| 5,318,857 | 6/1994 | Haluska | 428/552 |
| 5,328,645 | 7/1994 | Lin et al. | 252/315 |

OTHER PUBLICATIONS

Abstract of Proc. SPIE– Int. Soc. Opt. Eng., 1128 (Glasses Optoelectron), pp. 17–24, 1989, Unger, et al.
Abstract of J. Ceram. Soc. Jpn. 101 (Sep.), 1081–3, 1993 Itoh et al.
Abstract of JP 63–147831, Jun. 1988.
Abstract of JP06–298545, Oct. 1994.

*Primary Examiner*—Shrive Beck
*Assistant Examiner*—Erma Cameron
*Attorney, Agent, or Firm*—Richard S. Roberts; Michael J. Doyle

[57] ABSTRACT

A relaxed sol-gel composition and a coated substrate article which is produced therefrom. A tetrafunctional alkoxide silicate is hydrolyzed in an aqueous solution together with a Lewis acid or metal chelate catalyst with optional protic acid until a viscosity of 2600–3200 cps is obtained to form a crosslinked sol-gel polymer composition. The polymer is relaxed by diluting it with water or water plus alcohol optionally containing a Lewis acid or metal chelate until a viscosity of about 1 cps is obtained while not depolymerizing the polymer. The relaxed polymer has substantially no visible polymer particles. The relaxed polymer composition is uniformly coating a substrate and dried without requiring an in-situ curing.

21 Claims, 1 Drawing Sheet

Sols Change in Viscosity with Time

■ Example 1
□ Example 2

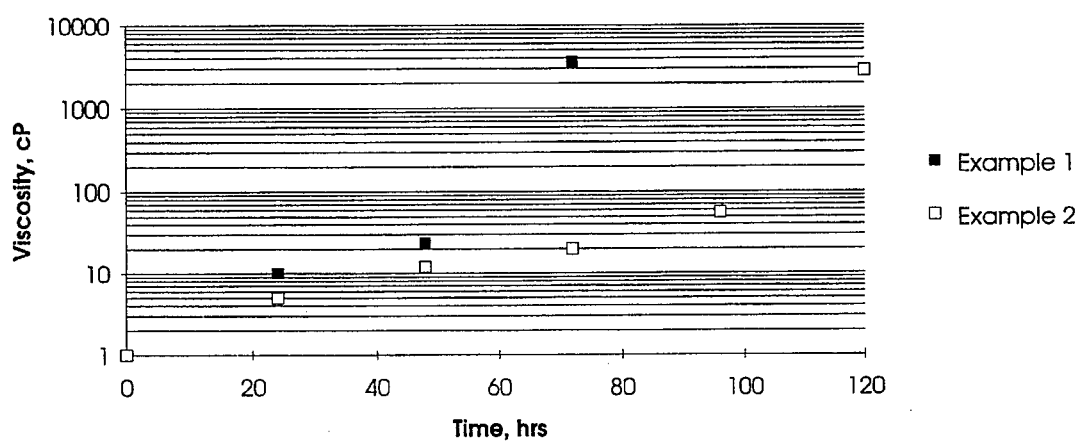
Figure 1. Sols Change in Viscosity with Time

SOL GEL BARRIER FILMS

This is a divisional of application Ser. No. 08/398,636 filed on Mar. 3, 1995, now U.S. Pat. No. 5,5510,147.

BACKGROUND OF THE INVENTION

1. Field of the Invention

The present invention relates to improved sol-gel barrier films. More particularly, the invention pertains to sol-gel coated polymer films which do not require thermal or electron beam densification to obtain useful oxygen barrier films.

2. Description of the Prior Art

It is known in the art that SiOx barrier coatings may be produced on substrates either by thermal evaporation of silica dioxide or plasma enhanced chemical vapor deposition off organo silicones. Both of these processes are expensive due to materials costs or processing costs. However they are the only currently available methods available to glass coat polymer films because these processes do not destroy the integrity of the films. U.S. Pat. No. 5,084,356 illustrates vapor depositing $SiO_2$ onto a substrate. An alternate method of producing silica films is by the sol gel method. This process requires densifying the sol gel coating to SiO2 by increasing the Si—O—Si bond content and eliminating water in the process. Two methods are available to accomplish this. One requires that the monomeric sol-gel coating be heated to over 800° C. and the other requires the sol-gel coating to be exposed to an electron beam. U.S. Pat. Nos. 5,318,857; 5,186,745; 5,091,009; 5,013,588; 4,997,482; 4,385,086; 4,361,598; 5,096,738; 5,091,224; 4,614,673 illustrate the coating of a monomer followed by in-situ cure by heating. These methods have disadvantages that effect the choice of substrate and the economics of the coating process.

The process of the present invention produces a glass-like coated polymer film by the sol-gel method without thermal or electron beam densification to obtain a useful oxygen barrier film. According to the process, a relaxed sol-gel composition is formed by hydrolyzing a tetrafunctional alkoxide silicate in an aqueous solution including a Lewis acid or metal chelate catalyst to produce a pre-crosslinked polymer having a viscosity of about 2600–3200 cps. The crosslinked polymer is then relaxed without depolymerizing it by diluting to a viscosity of about 1 cps. This is then coated on a substrate and dried without undergoing a curing. None of the aforementioned patents show coating of a polymer. Rather they coat monomers and then cure in-situ.

U.S. Pat. No. 4,842,901 precondenses tetraethyl ortho silicate, water, acid and a $C_4$ or higher alcohol, deposition on a substrate and drying, however there is no redilution to relax the polymer. U.S. Pat. No. 4,966,812 shows a reliquification by an ultrasonic breaking of polymer bonds with subsequent dilution, however, there is no dilution of a fully condensed polymer composition and this disclosure does not show use of a Lewis acid. U.S. Pat. No. 4,842,837 discloses hydrolyzing alkoxysilane with an alkaline catalyst and U.S. Pat. Nos. 5,328,645; 4,741,778; and 4,789,563 show the use of an alkaline hydrolysis or condensation. However, alkaline catalysts form polymer particles which produce a non-uniform coating. None of the foregoing patents disclose preformation of a cured polymer using a Lewis acid, relaxing the polymer by redilution and coating a cured polymer with subsequent drying. This invention produces a high oxygen barrier film on the substrate that is stable to heat and moisture while being extremely thin film (preferably<0.1 micron) and thus eases the recycling of the material.

SUMMARY OF THE INVENTION

The invention provides a method of producing a relaxed sol-gel composition which comprises hydrolyzing a tetrafunctional alkoxide silicate in an aqueous solution comprising water or water plus a $C_1$ to $C_4$ alcohol and a catalyst. The catalyst is selected from the group consisting of a protic acid, Lewis acid, a metal chelate, a Lewis acid plus a protic acid, and metal chelate plus a protic acid. The reaction is conducted at a pH of from about 1 to about 3. Hydrolysis is conducted until a viscosity of 2600–3200 cps is obtained to thereby produce a crosslinked sol-gel polymer composition. The latter is then relaxed and substantially complete hydrolysed of any residual alkoxyl groups thereof by diluting it with water or water plus a $C_1$ to $C_4$ alcohol, optionally containing a Lewis acid or metal chelate until a viscosity of about 0.5 to about 5 cps is obtained to produce a relaxed sol-gel polymer composition while substantially not depolymerizing the polymer. The relaxed sol-gel polymer composition has substantially no visible polymer particles therein. It is an important feature of the invention that at least one of the foregoing steps is conducted with a Lewis acid or metal chelate. In a subsequent step the relaxed sol-gel polymer composition is substantially dried without additional curing. The invention also provides a coated substrate article produced by coating the relaxed sol-gel polymer composition onto a substrate with subsequent drying.

BRIEF DESCRIPTION OF THE DRAWING

FIG. 1 shows the change in viscosity with time for the compositions of Examples 1 and 2.

DETAILED DESCRIPTION OF THE PREFERRED EMBODIMENT

The process will be illustrated by reference to the preferred embodiment. A relaxed sol-gel composition is formed by hydrolyzing and crosslinking a tetrafunctional alkoxide silicate. Tetrafunctional alkoxide silicates useful for this invention include tetra-$C_1$ to $C_9$ alkyl ortho silicate although the most preferred are tetraethyl orthosilicate (TEOS) and tetramethyl orthosilicate. The hydrolysis is conducted in an aqueous solution comprising water or water plus a $C_1$ to $C_4$ alcohol. The intermediate hydrolysis converts the alkoxy group to a hydroxy group and this latter then polymerizes and crosslinks. The hydrolysis is conducted with a catalyst which can be a Lewis acid, a metal chelate, a Lewis acid plus a protic acid or a metal chelate plus a protic acid. Lewis acids non-exclusively include aluminum chloride, iron chloride and zinc chloride. Protic acids include hydrochloric acid, nitric acid and acetic acid among others. Metal chelates include beta diketones such as aluminum, chromium and zirconium acetylacetonate. The hydrolysis may be conducted in two stages by first hydrolyzing with the protic acid and then with the Lewis acid or metal chelate. The Lewis acid or metal chelate is important for the invention since it allows the tetrafunctional alkoxide silicate to condense and crosslink more completely than would be obtained if a protic acid alone is used. The condensation or ripening is conducted until a viscosity of 2600–3200 cps is obtained to produce a crosslinked sol-gel polymer composition. This usually takes from about three to about five days. The catalyst is present in that amount sufficient to catalyze the condensation and crosslinking. The Lewis acid or metal chelate is preferably present in an amount of from about 1% to about 10% by weight of the tetrafunctional alkoxide silicate, more preferably from about 2% to about 6%. The protic acid, when one is used, is preferably present in an amount of from about 0.5% to about 10% by weight of the tetrafunctional alkoxide silicate, more preferably from about 1% to about 4%.

After the TEOS gel has ripened it is then diluted with water or a 50/50 mixture of water/ethanol one to four times. In one embodiment of the invention, this solution may contain the Lewis acid or metal chelate to bring the condensation reaction to completion. However, at least of one the hydrolysis and dilution steps must be conducted with a sufficient amount of a Lewis acid or metal chelate to bring the condensation reaction to substantial completion. The dilution serves to relax the condensed polymer without causing a depolymerization. The preferred viscosity ranges from about 0.5 cps to about 5 cps, preferably about 0.5 to about 1.5 cps and most preferably about 1 cps. The relaxed sol-gel polymer composition has substantially no visible polymer particles. This process improves on prior art processes which merely condense until a low viscosity of about 10 cps is obtained. The prior processes inherently produce coatings with visible polymer particles and no significant improvement in oxygen transmission rate. The relaxed sol-gel composition may additionally comprising a colorant such as a uv or infrared absorbing dye.

Then the solution is coated down onto a substrate which is preferably substantially non-porous. Typical substrates non-exclusively include glass, metals, polyesters such as polyethylene terephthalate, polyethylene, polyolefins such as polypropylene, cellulosic polymers such as cellulose acetate butyrate, among many others. These articles afford oxygen barrier, abrasion resistance and rust and corrosion proofing. Thereafter, the solution is dried. The drying is effective to evaporate and substantially remove the water and alcohol solvents, however, there is substantially no additional condensation or curing of the crosslinked polymer. In the preferred embodiment, the drying is conducted in the absence of applied heat. The temperature is not critical and may range from about 10° C. to about 130° C. depending on economical drying times, but preferably drying is conducted at about room temperature.

The coated substrate article preferably has an oxygen transmission rate of less than about 20% that of the uncoated substrate. Preferably the coated substrate has an oxygen transmission rate of less than about 10 $cm^3/M^2/day$ as calculated by ASTM D-3985. The substrate is coated with a substantially uniform coating of the relaxed sol-gel polymer composition at a thickness not in excess of that which would provide a substantially crack-free layer on the substrate when dried. One then dries the relaxed sol-gel polymer composition to provide a substantially crack-free layer on the substrate. The dried, substantially uniform coating on the substrate is one which is substantially crack free and has a preferred thickness of about 0.5 micron or less, preferably 0.2 micron or less and may optionally comprises more than one layer of the relaxed polymer composition. This invention is capable of affording an effective oxygen barrier coating at room temperature.

The following non-limiting examples serve to illustrate the invention.

EXPERIMENTAL PROCEDURE

In the following examples, metal alkoxide, tetraethoxy orthosilicate (TEOS) is dissolved in a ethanol/water solution, the molar ratio of TEOS to ethanol to water was varied from 1/2/5, 1/3/5, 1/4/5 and 1/3/7. The solution is hydrolyzed with concentrated HCl, or a Lewis acid, or HCl and a Lewis acid, or HCl and a metal chelate compound. Then the solution is allow to age from 3 to 7 days depending on the initial reactants molar ratios to a viscosity of 2600 to 3200 cP (Brookfield #4 spindle @ 50 rpm). At that time the gel is diluted with a water/ethanol mixture or ethanol to a viscosity of 1–5 cP. FIG. 1 shows the change in viscosity with time before dilution for the sols of Examples 1 and 2. Before coating down on 48 gauge PET a Lewis acid or a metal acetoacetonate (AcAc) is added. The coatings are laid down using either a #7, or #32 wire wound rod or dip coated. The samples are air dried.

EXAMPLE 1

A hydrolysis was carried out by mixing 92 grams of ethanol, 208 grams of tetraethoxy orthosilicate, 90 grams of water and 2.5 grams of concentrated hydrochloric acid. The solution was stirred and aged until the Brookfield viscosity (#4 spindle @ 50 rpm) of the solution was 2600–3200 cp, approximately 72 hours. There were no visible signs of any particles in solution. At this point the viscous solution was diluted four fold with a 50:50 solution of water/ethanol which contained 2% (by weight) of a Lewis acid, $FeCl_3$. The solution was visibly clear and had a viscosity of 5 cp. The solution was coated down onto 48 gauge PET film with a #7 wire wound rod and air dried. The thickness of the dried film is estimated to be 0.1 microns and SEM photomicrographs show no cracking of the film. The resultant oxygen transmission (OTR) rate at 0% Relative Humidity (RH) was 22 $cm^3/m^2/day$.

EXAMPLE 2

A hydrolysis was carried out by mixing 138 grams of ethanol, 20 g grams of tetraethoxy orthosilicate, 90 grams of water and 1.2 grams of concentrated hydrochloric acid. The solution was stirred and aged until the Brookfield viscosity (#4 spindle @ 50 rpm) of the solution was 2600–3200 cp, approximately 120 hours. There were no visible signs of any particles in solution. At this point the viscous solution was diluted, four fold with a 50:50 solution of water/ethanol which contained 1% (by weight) of a metal chelate, Al acetoacetonate ( Al AcAc ). The solution was visibly clear and had a viscosity of 1 cp. The solution was coated onto 48 gauge PET film with a #32 wire wound rod and air dried. The resultant oxygen transmission (OTR) rate at 0% Relative Humidity was 15 $cm^3/m^2/day$. The thickness of the dried film is estimated to be 0.2 microns and SEM photomicrographs show no cracking of the film.

EXAMPLE 3

A hydrolysis was carried out by mixing 92 grams of ethanol, 208 grams of tetraethoxy orthosilicate, 90 grams of water and 3.4 grams of $AlCl_3$ and 1.2 grams of concentrated hydrochloric acid.

The solution was stirred and aged till the Brookfield viscosity (#4 spindle @ 50 rpm) of the solution was 2600–3200 cp. There were no visible signs of any particles in solution. At this point the viscous solution was diluted four fold with a 7:3 solution of water/ethanol which contained 2% (by weight) of a Lewis acid, $CrCl_3$. The solution was visibly clear and had a viscosity of 1 cp. The solution was coated down onto 48 gauge PET film with a #7 wire wound rod and air dried. The resultant oxygen transmission (OTR) rate at 0% Relative Humidity (RH) was 31 cm$^3$/m$^2$/day.

EXAMPLE 4

A hydrolysis was carried out by mixing 92 grams of ethanol, 208 grams of tetraethoxy orthosilicate, 90 grams of water and 2.5 grams of concentrated hydrochloric acid. The solution was stirred and aged until the Brookfield viscosity (#4 spindle @ 50 rpm) of the solution was 2600–3200 cp, approximately 72 hours. There were no visible signs of any particles in solution. At this point the viscous solution was diluted three fold with ethanol which contained 2% (by weight) of a Lewis acid, AlCl$_3$. The solution was visibly clear and had a viscosity of 5 cp. The solution was coated down onto 48 gauge PET film using a dip coating method and then air dried. The resultant oxygen transmission (OTR) rate at 75% Relative Humidity was 13 cm$^3$/m$^2$/day.

EXAMPLE 5

A hydrolysis was carried out by mixing 92 grams of ethanol, 208 grants of tetraethoxy orthosilicate, 126 grams of water, 2.5 grams of concentrated hydrochloric acid and 2.2 of AlAcAc The solution was stirred and aged until the Brookfield viscosity (#4 spindle @ 50 rpm) of the solution was 2600–3200 cp. There were no visible signs of any particles in solution. At this point the viscous solution was diluted three fold with ethanol which contained 2% (by weight) of a Lewis acid, FeCl$_3$. The solution was visibly clear and had a viscosity of 2 cp. The solution was coated down onto 48 gauge PET film using a dip coating method and then air dried. The resultant oxygen transmission (OTR) rate at 75% Relative Humidity was 80 cm$^3$/m$^2$/day.

EXAMPLE 6

Example 1 was repeated with the following conditions. A hydrolysis was carried out by mixing ethanol, tetraethoxy orthosilicate (TEOS), water and concentrated hydrochloric acid. The molar ratio of water to TEOS was 5, the molar ratio of ethanol to TEOS was 2 and the molar ratio of HCl to TEOS was 0.07. The viscous solution was diluted four fold with a 50:50 solution of water/ethanol which contained 2% (by weight) of a Lewis acid, AlCl$_3$. The solution was coated down onto 48 gauge PET film with a #7 wire wound rod and air dried. The resultant oxygen transmission rate was 20 cm$^3$/m$^2$/day.

EXAMPLE 7

Example 1 was repeated with the following conditions. A hydrolysis was carried out by mixing ethanol, tetraethoxy orthosilicate (TEOS), water and concentrated hydrochloric acid. The molar ratio of water to TEOS was 5, the molar ratio of ethanol to TEOS was 2 and the molar ratio of acids to TEOS was 0.07. The viscous solution was diluted four fold with a 1:1 solution of water/ethanol which contained 6% (by weight) of a Lewis acid, AlCl$_3$. The solution was coated down onto 48 gauge PET film with a #7 wire wound rod and air dried. The resultant oxygen transmission rate was 51 cm$^3$/m$^2$/day.

EXAMPLE 8

Example 1 was repeated with the following conditions. A hydrolysis was carried out by mixing ethanol, tetraethoxy orthosilicate (TEOS), water and concentrated hydrochloric acid. The molar ratio of water to TEOS was 5, the molar ratio of ethanol to TEOS was 2 and the molar ratio of HCl to TEOS was 0.07. The viscous solution was diluted four fold with a 1.1 solution of water/ethanol which contained 6% (by weight) of a Lewis acid, AlCl$_3$. The solution dip coated onto 48 gauge PET film and air dried. The resultant oxygen transmission rate at 75% Relative Humidity was 21 cm$^3$/m$^2$/day.

EXAMPLE 9

Example 1 was repeated with the following conditions. A hydrolysis was carried out by mixing ethanol, tetraethoxy orthosilicate (TEOS), water and concentrated hydrochloric acid. The molar ratio of water to TEOS was 5, the molar ratio of ethanol to TEOS was 4 and the molar ratio of HCl to TEOS was 0.035. The viscous solution was diluted three fold with ethanol which contained 2% (by weight) of a Lewis acid, ZrAcAc. The solution was dip coated onto 48 gauge PET film and air dried. The resultant oxygen transmission rate at 75% Relative Humidity was 80 cm$^3$/m$^2$/day.

EXAMPLE 10

Example 1 was repeated with the following conditions. A hydrolysis was carried out by mixing ethanol, tetraethoxy orthosilicate (TEOS), water, concentrated hydrochloric acid and AlAcAC. The molar ratio of water to TEOS was 7, the molar ratio of ethanol to TEOS was 3 and the molar ratio of acid to TEOS was 0.07. The viscous solution was diluted three fold with ethanol which contained 2% (by weight) of a Lewis acid, AlCl$_3$. The solution was dip coated onto 48 gauge PET film and air dried. The resultant oxygen transmission rate at 75% Relative Humidity was 93 cm$^3$/m$^2$/day.

COMPARATIVE EXAMPLE 11

A hydrolysis was carried out by mixing 92 grams of ethanol, 208 grams of tetraethoxy orthosilicate (TEOS), 90 grams of water, 2.5 grams of concentrated hydrochloric acid. The solution was stirred and aged until the Brookfield viscosity (#4 spindle @ 50 rpm) of the solution was 2600–3200 cp, approximately 72 hours. There were no visible signs of any particles in solution. At this point the viscous solution was diluted two fold with water which contained 2% (by weight) of a Lewis Acid AlCl$_3$. The solution was visibly clear and had a viscosity of 5 cp. The solution was coated onto 48 gauge PET film with a #7 wire wound rod and air dried. The resultant oxygen transmission (OTR) rate at 0% Relative Humidity was 122 cm$^3$/m$^2$/day. The thickness of the dried film was estimated to be 6.5 microns and SEM photomicrographs show extensive cracking of the film.

COMPARATIVE EXAMPLE 12

A hydrolysis was carried out by mixing 92 grams of ethanol, 208 grams of tetraethoxy orthosilicate (TEOS), 90 grams of water, 2.5 grams of concentrated hydrochloric acid. The solution was stirred and aged until the Brookfield viscosity (#4 spindle @ 50 rpm) of the solution was 2600–3200 cp, approximately 72 hours. There were no visible signs of any particles in solution. At this point the viscous solution was diluted four fold with a 1:1 ethanol-water which contained 2% (by weight) of a Lewis Acid FeCl$_3$. The solution was visibly clear and had a viscosity of 5 cp. The solution was coated onto 48 gauge PET film with a #7 wire wound rod and air dried. The resultant oxygen transmission (OTR) rate at 0% Relative Humidity was 124 cm$^3$/m$^2$/day. The thickness of the dried film was estimated to be 0.5 microns. The coating is noticed to be non-uniform since it has particles of about 0.5 microns in diameter. SEM photomicrographs show extensive cracking of the film.

What is claimed is:

1. A relaxed sol-gel composition produced by the method which comprises
   (a) hydrolyzing a tetrafunctional alkoxide silicate in an aqueous solution comprising water or water plus a $C_1$ to $C_4$ alcohol, and an acid catalyst selected from the group consisting of a protic acid, a Lewis acid, a metal chelate, a Lewis acid plus a protic acid, and a metal chelate plus a protic acid, until a viscosity of 2600–3200 cps is obtained to thereby produce a crosslinked sol-gel polymer composition;
   (b) relaxing the crosslinked sol-gel polymer composition and effecting hydrolysis of any residual alkoxyl groups thereof by diluting the crosslinked sol-gel polymer composition with water or water plus a $C_1$ to $C_4$ alcohol optionally containing a Lewis acid or metal chelate until a viscosity of about 0.5 to about 10 cps is obtained to thereby produce a relaxed sol-gel polymer composition while substantially not depolymerizing said polymer and which relaxed sol-gel polymer composition has substantially no visible polymer particles therein; and wherein at least one of steps (a) and (b) is conducted with a Lewis acid or metal chelate.

2. The composition of claim 1 which undergoes the further subsequent step of drying the relaxed sol-gel polymer composition without additional curing.

3. The composition of claim 2 wherein said drying is conducted at from about 10° C. to about 130° C.

4. The composition of claim 1 wherein the tetrafunctional alkoxide silicate is a tetra $C_1$ to $C_9$ alkyl ortho silicate.

5. The composition of claim 1 wherein the tetrafunctional alkoxide silicate is tetraethyl ortho silicate or tetramethyl ortho silicate.

6. The composition of claim 1 wherein the Lewis acid is selected from the group consisting of aluminum chloride, iron chloride and zinc chloride.

7. The composition of claim 1 wherein the protic acid is selected from the group consisting of hydrochloric acid, nitric acid and acetic acid.

8. The composition of claim 1 wherein the metal chelate is a beta diketone.

9. The composition of claim 1 wherein the metal chelate is selected from the group consisting of aluminum, chromium and zirconium acetylacetonate.

10. The composition of claim 1 wherein step (a) is conducted for from about 3 to about 5 days.

11. The composition of claim 1 further comprising a colorant.

12. A coated substrate article produced by the method which comprises
    (a) hydrolyzing a tetrafunctional alkoxide silicate in an aqueous solution comprising water or water plus a $C_1$ to $C_4$ alcohol, and an acid catalyst selected from the group consisting of a protic acid, a Lewis acid, a metal chelate, a Lewis acid plus a protic acid, and a metal chelate plus a protic acid, until a viscosity of 2600–3200 cps is obtained to thereby produce a crosslinked sol-gel polymer composition;
    (b) relaxing the crosslinked sol-gel polymer composition and effecting hydrolysis of any residual alkoxyl groups thereof by diluting the crosslinked sol-gel polymer composition with water or water plus a $C_1$ to $C_4$ alcohol optionally containing a Lewis acid or metal chelate until a viscosity of about 0.5 to about 10 cps is obtained to thereby produce a relaxed sol-gel polymer composition while substantially not depolymerizing said polymer and which relaxed sol-gel polymer composition has substantially no visible polymer particles therein; and wherein at least one of steps (a) and (b) is conducted with a Lewis acid or metal chelate;
    (c) coating the substrate with a uniform coating of the relaxed sol-gel polymer composition at a thickness not in excess of that which would provide a substantially crack-free layer on the substrate when dried; and
    (d) drying the relaxed sol-gel polymer composition to provide a substantially crack-free layer on the substrate.

13. The article of claim 12 wherein the substrate is substantially non-porous.

14. The article of claim 12 wherein the substrate comprises glass, metal, polyester, polyolefin or a cellulosic polymer.

15. The article of claim 12 wherein the coated substrate article has an oxygen transmission rate of less than about 20% of the uncoated substrate.

16. The article of claim 12 wherein the coated substrate article has an oxygen transmission rate of less than about 10 $cm^3/M^2/day$.

17. The article of claim 12 wherein the drying is conducted in the absence of applied heat.

18. The article of claim 12 wherein the drying is conducted at about room temperature.

19. The article of claim 12 wherein said drying is conducted at from about 10° C. to about 130° C.

20. The article of claim 12 wherein the uniform coating on the substrate has a thickness of less than about 0.5 micron.

21. The article of claim 12 wherein a plurality of uniform coatings are applied to the substrate.

* * * * *